(12) United States Patent
Lambert et al.

(10) Patent No.: US 7,676,666 B2
(45) Date of Patent: Mar. 9, 2010

(54) VIRTUAL BIOS FIRMWARE HUB

(75) Inventors: Timothy Lambert, Austin, TX (US);
Stephen Cochran, Cedar Park, TX (US);
Mukund P. Khatri, Austin, TX (US);
Pedro Lopez, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 585 days.

(21) Appl. No.: 11/345,818

(22) Filed: Feb. 2, 2006

(65) Prior Publication Data

US 2007/0186086 A1     Aug. 9, 2007

(51) Int. Cl.
G06F 9/00      (2006.01)
G06F 9/24      (2006.01)
G06F 15/177    (2006.01)

(52) U.S. Cl. .................. 713/1; 713/2; 713/100
(58) Field of Classification Search ...... 713/1, 713/2, 100; 717/168; 709/223
See application file for complete search history.

(56) References Cited

U.S. PATENT DOCUMENTS

| | | | |
|---|---|---|---|
| 5,230,052 A * | 7/1993 | Dayan et al. ............ | 713/2 |
| 6,282,643 B1 * | 8/2001 | Cromer et al. ............ | 713/2 |
| 6,357,003 B1 | 3/2002 | Zarrin et al. ............ | 713/2 |
| 6,903,727 B2 | 6/2005 | Mambakkam et al. ...... | 345/168 |
| 6,904,484 B1 | 6/2005 | Nelson ............ | 710/300 |
| 7,032,108 B2 * | 4/2006 | Maynard et al. ............ | 713/2 |
| 7,143,279 B2 * | 11/2006 | Goud et al. ............ | 713/2 |
| 7,231,513 B1 * | 6/2007 | Eydelberg ............ | 713/2 |
| 7,240,188 B2 * | 7/2007 | Takata et al. ............ | 713/1 |
| 7,293,165 B1 * | 11/2007 | Tobias ............ | 713/2 |
| 7,353,377 B2 * | 4/2008 | Ong et al. ............ | 713/2 |
| 7,360,072 B1 * | 4/2008 | Soltis et al. ............ | 713/1 |
| 2005/0108513 A1 * | 5/2005 | Lam ............ | 713/2 |
| 2005/0229173 A1 * | 10/2005 | Mihm et al. ............ | 717/171 |
| 2006/0020837 A1 * | 1/2006 | Rothman et al. ............ | 713/310 |
| 2006/0136703 A1 * | 6/2006 | Wisecup et al. ............ | 713/2 |
| 2007/0294575 A1 * | 12/2007 | Aichelen et al. ............ | 714/13 |

* cited by examiner

Primary Examiner—Mark Connolly
(74) Attorney, Agent, or Firm—Baker Botts L.L.P.

(57) ABSTRACT

A baseboard management controller (BMC) of a blade server module in an information handling system may operate as a virtual system BIOS firmware hub that may have automatic firmware updating through a TFTP transfer from a chassis management controller (CMC) or for rack/tower servers from a remote assistant card (RMC). The system BIOS may be stored in a RAM drive or a ROM of the BMC. Valuable printed circuit board real estate and hardware for a firmware hub is no longer necessary since the BMC may have the capacity to act as a virtual system BIOS firmware hub in addition to its other functions.

16 Claims, 3 Drawing Sheets

VIRTUAL BIOS FIRMWARE HUB

TECHNICAL FIELD

The present disclosure relates generally to information handling systems and, more particularly, to information handling systems having virtual basic input output operating system (BIOS) firmware hubs.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, RAID disk system and telecommunications switch.

As consumer demand increases for smaller and denser information handling systems, manufacturers strive to integrate more computer components into a smaller space. This integration has led to the development of several applications, including high density servers. A high density server provides the computer processing resources of several computers in a small amount of space. A typical arrangement for a high density server includes a shared power supply system, a management module, a connection board (e.g., a back-plane or mid-plane) and server modules, such as blade server modules.

Blade server modules, or "blades," are miniaturized server modules that typically are powered from a common power supply system and are cooled by cooling system within a multi-server cabinet. Typically, a blade includes a circuit board with one or more processors, memory, a connection port, and possibly a disk drive for storage. By arranging a plurality of blades like books on a shelf in the multi-server cabinet, a high density multi-server system achieves significant cost and space savings over a plurality of conventional servers. These savings result directly from the sharing of common resources, e.g., power supplies, cooling systems, enclosures, etc., and the reduction of space required by this type of multi-server system while providing a significant increase in available computer processing power.

For information systems of all sizes, firmware image management is a big issue in server environments, especially in blade server systems. Firmware management may consist of keeping basic input output operating system (BIOS), baseboard management controller (BMC) firmware, chassis management controller (CMC) firmware, etc., up to date.

System BIOS, typically, is stored in a firmware hub that may be a FLASH memory device having a low pin count (LPC) interface and may have about one megabyte (1 MB) memory capacity. The BIOS FLASH memory is not an insignificant cost and takes up valuable printed circuit board space which is becoming more and more critical as the motherboards become smaller and more complex, e.g., blade servers and small form factor platforms. Also, keeping the blade servers, etc., within a chassis up to date and in synchronization with proper BIOS revisions can be a time consuming and tedious administrative task.

SUMMARY

What is needed for systems having at least one baseboard management controller (BMC) is optimization of the firmware hub functionality as part of the BMC subsystem. This may provide cost and printed circuit board real estate savings, and may improve firmware image management while maintaining compatibility with chipsets and current/future information handling system architectures.

According to a specific example embodiment of the present disclosure, an information handling system may comprise a plurality of blade server modules, wherein each of the plurality of blade server modules has a baseboard management controller (BMC) comprising a BMC processor, a BMC random access memory (RAM) and a BMC read only memory (ROM); and a chassis management controller (CMC), wherein the CMC comprises a CMC service processor, a CMC ROM and a CMC RAM; wherein the CMC ROM stores a plurality of basic input-output system (BIOS) firmware images for the plurality of blade server modules and the CMC service processor transfers the plurality of BIOS firmware images to respective ones of the plurality of blade server modules.

According to another specific example embodiment of the present disclosure, an information handling system may comprise at least one server, wherein the at least one server has a baseboard management controller (BMC) comprising a BMC processor, a BMC random access memory (RAM) and a BMC read only memory (ROM); and a remote assistant card (RMC), wherein the RMC comprises a RMC service processor, a RMC ROM and a RMC RAM; wherein the RMC ROM stores at least one basic input-output system (BIOS) firmware image for the at least one server and the RMC service processor transfers the at least one BIOS firmware image to a respective one of the at least one server.

According to yet another specific example embodiment of the present disclosure, a blade server module, may comprise a central processing unit (CPU); a chipset coupled to the CPU; a BMC processor coupled to the chipset; a BMC random access memory (RAM) coupled to the BMC processor; and a BMC read only memory (ROM) coupled to the BMC processor; the BMC processor is adapted for coupling to a chassis management controller (CMC), wherein the CMC comprises a CMC service processor, a CMC ROM and a CMC RAM; whereby the CMC ROM stores an input-output system (BIOS) firmware image for the blade server module and the CMC service processor transfers the BIOS firmware image to the blade server module.

According to still another specific example embodiment of the present disclosure, a method for supplying up-to-date BIOS firmware images in a blade server information handling system may comprise the steps of storing a plurality of basic input-output system (BIOS) firmware images in a chassis management controller (CMC); transferring the stored plurality of BIOS firmware images to respective ones of a plurality of blade server modules; and booting up the plurality of blade server modules from the transferred plurality of BIOS firmware images.

According to another specific example embodiment of the present disclosure, a method for supplying up-to-date BIOS firmware images in a server information handling system may comprise the steps of storing at least one basic input-output system (BIOS) firmware image in a remote assistant card (RMC); transferring the stored at least one BIOS firmware image to a respective one of at least one server; and booting up the at least one server from the transferred at least one BIOS firmware image.

BRIEF DESCRIPTION OF THE DRAWINGS

A more complete understanding of the present disclosure thereof may be acquired by referring to the following description taken in conjunction with the accompanying drawings wherein.

Figure 1:
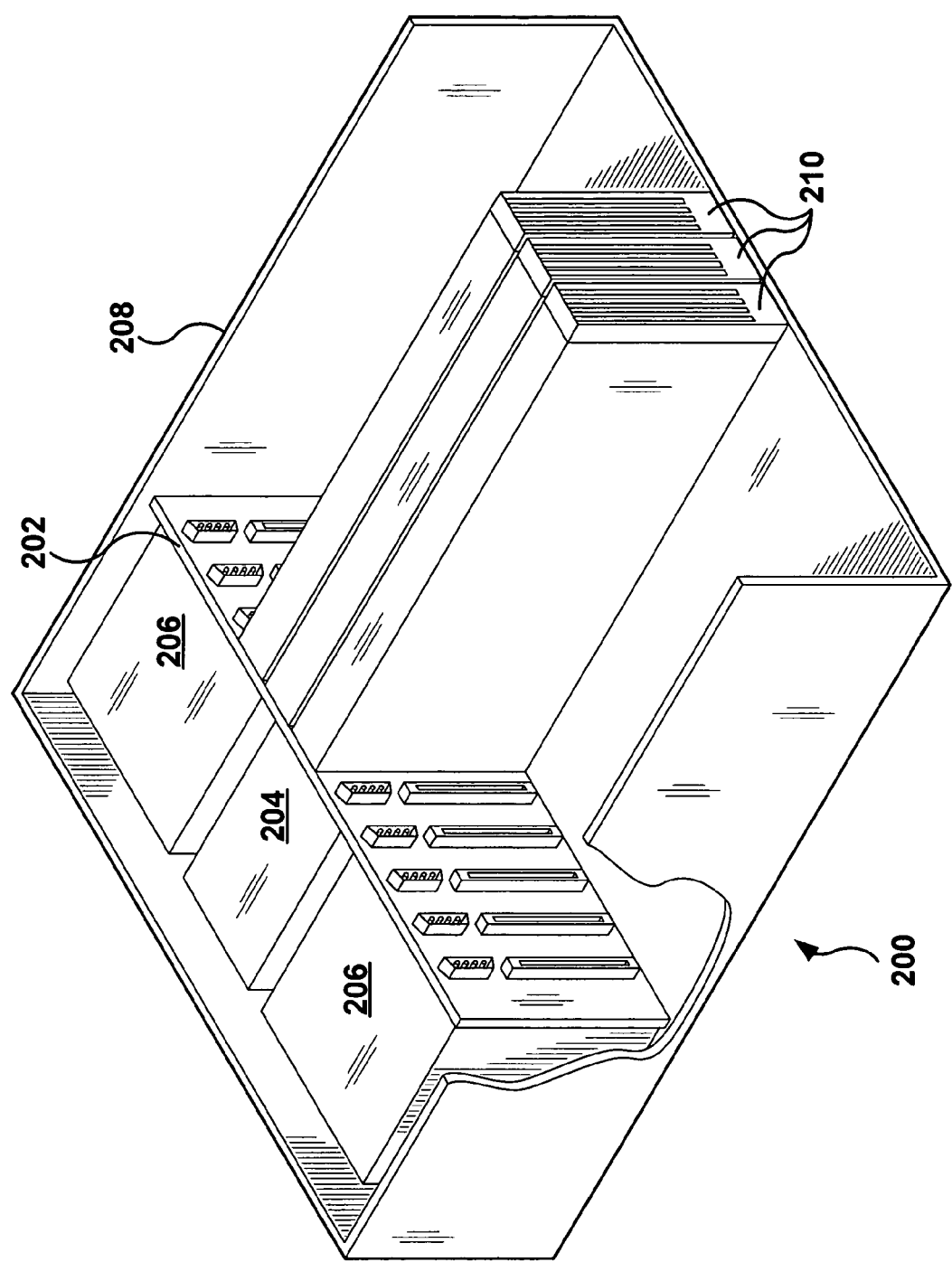
FIG. 1 is a schematic perspective view of a high density information handling blade server system, according to a specific example embodiment of the present disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of specific example embodiments are schematically illustrated. Like elements in the drawings will be represented by like numbers, and similar elements will be represented by like numbers with a different lower case letter suffix.

Referring to FIG. 1, depicted is a schematic perspective view of a high density information handling blade server system, according to a specific example embodiment of the present disclosure. The information handling server system, generally represented by the numeral 200, comprises at least one blade server module (BSM) 210, a power distribution board (PDB) 202, at least one power supply unit (PSU) 206 and a chassis management controller (CMC) 204 (blade server system) or remote assistant card (RAC) 204 (rack and tower servers). In certain embodiments, one example of an information handling server system 200 includes a high density server system 200 that may form a part of a component rack system (not expressly shown). Typically, the high density server system 200 may include an enclosure or chassis 208 in which the at least one PSU 206, CMC 204, PDB 202 and the at least one BSM 210 may be enclosed therein. Each BSM 210 may include a blade management controller (BMC) 212 (see FIG. 2).

Although FIG. 1 depicts a mid-plane PDB 202 as being placed between the CMC 204 and the at least one BSM 210, the PDB 202 may be located anywhere in the information handling system 200, even external to the chassis 208. In alternate embodiments, the PDB 202 may be located along the back of the information handling server system 200 and may be referred to as a power distribution back-plane (not shown).

The high density server system 200 may be coupled to other computer components such as keyboards, video displays and pointing devices (not expressly shown). Typically, the information handling system 200 may include more than one PSU 206 such that a redundant power source may be provided. The PSU 206 may supply an output, e.g., an electrical voltage(s) for the at least one BSM 210. Generally, the PSU 206 output is coupled through the PDB 202 for distribution to the at least one BSM 210.

Figure 2:
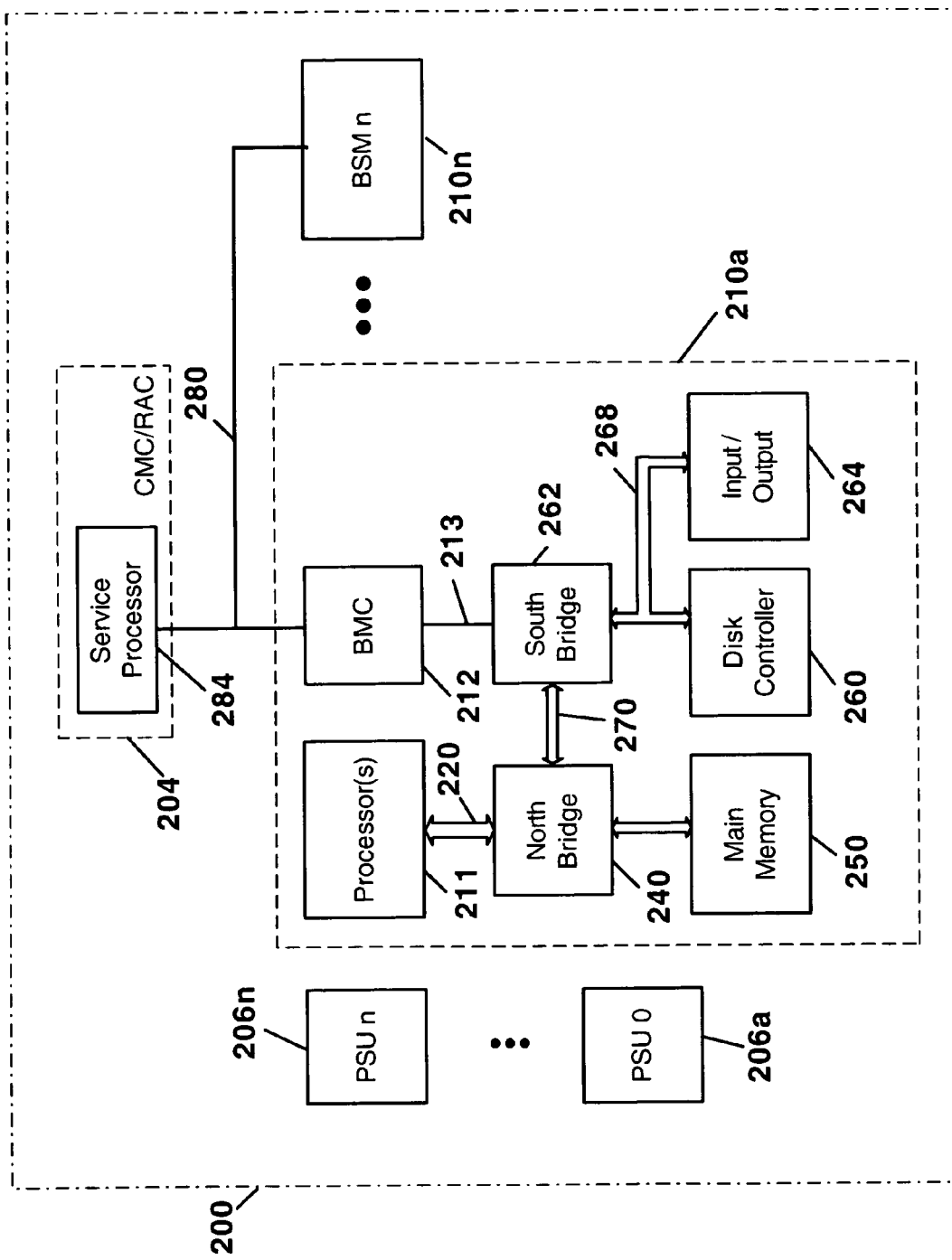
FIG. 2 is a schematic block diagram of an information handling server system having electronic components mounted on at least one printed circuit board (PCB) (motherboard not shown) and communicating data and control signals therebetween over signal buses.

Referring to FIG. 2, depicted is an information handling blade server system having electronic components mounted on at least one printed circuit board (PCB) (motherboard not shown) and communicating data and control signals therebetween over signal buses. In one example embodiment, the information handling server system is a computer blade server system. The information handling server system, generally referenced by the numeral 200, may comprise one or more blade server modules (BSMs) 210a-210n. For each of the blade server modules (BSMs) 210a-210n (for illustrative purposes only components for BSM 210a are shown) there may be a processor(s) 211, a north bridge 240, which may also be referred to as a memory controller hub or a memory controller that is coupled to a main system memory 250, and a blade management controller (BMC) 212. The north bridge 240 may be coupled to the processor(s) 211 via a host bus 220. The north bridge 240 is generally considered an application specific chip set that provides connectivity to various buses, and integrates other system functions such as a memory interface. For example, an Intel 820E and/or 815E chip set, available from the Intel Corporation of Santa Clara, Calif., provides at least a portion of the north bridge 240. The chip set may also be packaged as an application specific integrated circuit (ASIC). The north bridge 240 typically includes functionality to couple the main system memory 250 to other devices within the information handling system 200. Thus, memory controller functions such as main memory control functions typically reside in the north bridge 240. In addition, the north bridge 240 provides bus control to handle transfers between the host bus 220 and a second bus(es), e.g., PCI bus 270. A third bus(es) 268 may also comprise other industry standard buses or proprietary buses, e.g., ISA, SCSI, I²C, SPI, USB, LPC buses through a south bridge(s) (bus interface) 262. The BMC 212 may be coupled to the blade 210a with a low pin count (LPC) bus 213 through the south bridge 262. Each BMC 212 of the blades 210 may be coupled to a service processor 284 in the CMC 204 over, for example but not limited to, a standard Ethernet link 280. The CMC 204 may control various blade system chassis functions and may be used to communicate (e.g., broadcast firmware updates) to each BMC 212 of the blades 210 in the blade server system 200.

Figure 3:
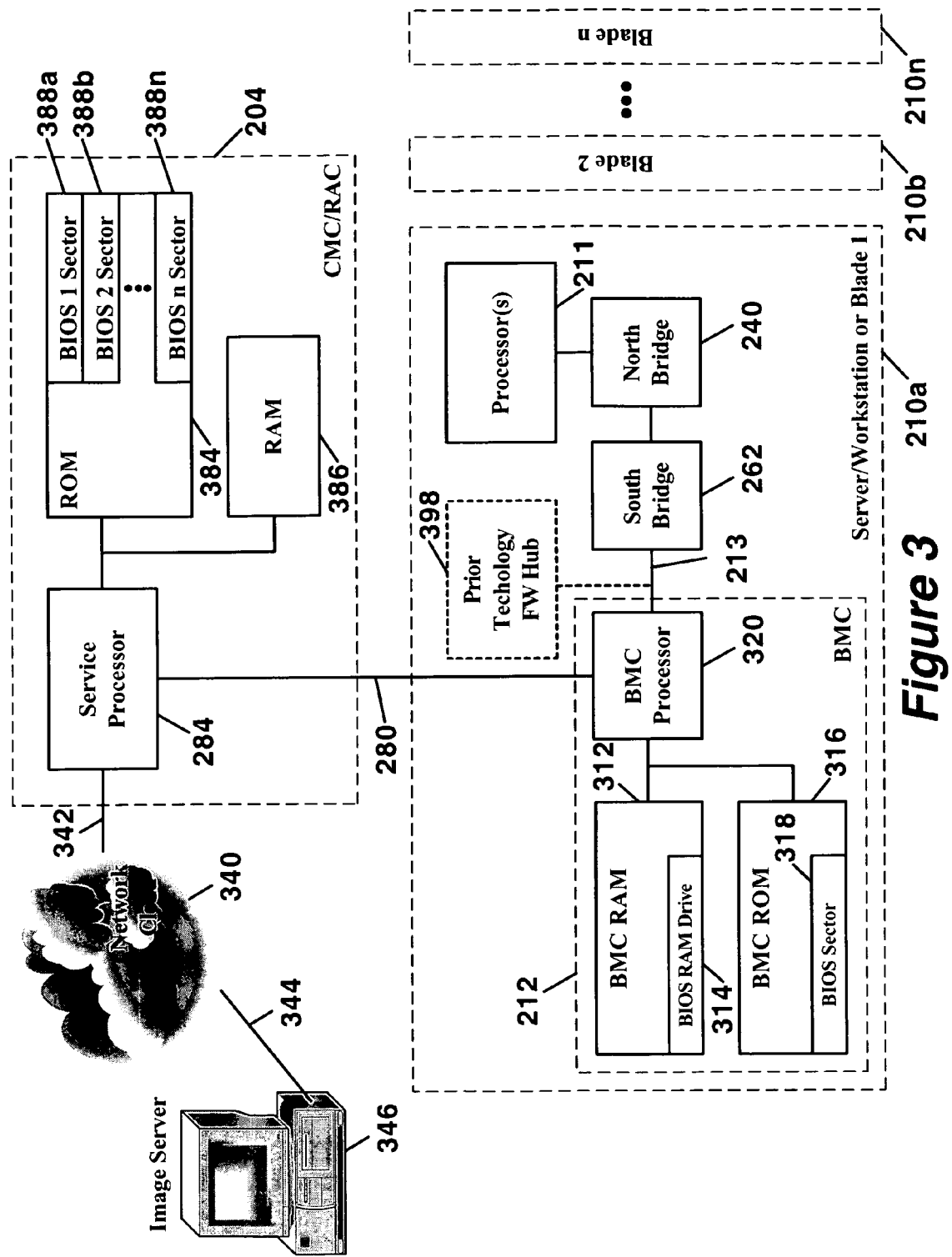
FIG. 3 is a schematic block diagram of a more detailed portion of the information handling server system shown in FIG. 2.

Referring now to FIG. 3, depicted is a schematic block diagram of a more detailed portion of the information handling blade server system shown in FIG. 2. The service processor 284 of the CMC 204 may be coupled to a management network 340 over a serial data link, e.g., Ethernet connection 342. An image server 346 may also be coupled to the management network 340 over a serial data link, e.g., Ethernet connection 344. The service processor 284 may thus communicate with the image server 346 via the Internet, Extranet, Intranet, etc., via an Ethernet hub or switch (not shown), or any other network topology, e.g., wireless, WIFI, WIMAX, etc. The image server 346 may send firmware images to the CMC 204, and the CMC 204 may store these firmware images in the CMC RAM 386 and/or CMC ROM 384.

Each BMC 212 may comprise a BMC processor 320, a BMC random access memory (RAM) 312 and a BMC read only memory (ROM) 316. The BMC RAM 312 may be configured to have a BIOS RAM drive 314, and the BMC ROM 316 may store a BIOS sector 318. The BMC processor 320 may be coupled to the south bridge 262 through the low pin count (LPC) bus 213. The BMC ROM 316 may be an electrically erasable and programmable read only memory (EEPROM), e.g., FLASH memory.

The CMC 204 may have a ROM 384 that may be coupled to the service processor 284. The latest BMC system BIOS firmware image(s) 388a-388n may be stored in the ROM 384 so that each BSM 210a-210n may have its respective system BIOS firmware image loaded from the CMC 204 to its respective BMC 212a-212n and stored in the respective BMC RAM 312 and/or BMC ROM 316 (e.g., BIOS RAM drive 314 and/or BIOS sector 318). The ROM 384 may be an electrically erasable and programmable read only memory (EEPROM), e.g., FLASH memory.

In prior technology information handling systems, a firmware hub 398, e.g., FLASH read only memory (ROM), may have been used to store the system BIOS software program(s) for the BSM 210. The prior technology firmware hub 398 may have been operationally coupled to the processor(s) 211 over a low pin count (LPC) bus 213 via the south bridge 262 and north bridge 240, e.g., glue logic chipsets. According to the present disclosure, the BMC 212 may effectively simulate operation of the prior technology firmware hub 398 via the LPC bus 213. Thus, the BMC 212 may be used for providing the system BIOS images to the BSM 210 instead of the prior technology dedicated firmware hub 398, e.g., FLASH ROM. Therefore, the prior technology firmware hub 398 may be eliminated from the BSM 210 (also for server/workstations and thin clients) with subsequent savings in the printed circuit board real estate and cost of the FLASH ROM per BSM 210.

A single easily updatable image for firmware (not just limited to BIOS) may be distributed to all BSMs 210 and/or clients within a chassis, e.g., chassis 208, or even to a broader computing environment, e.g., a plurality of information handling systems. A scalable size virtual system BIOS firmware hub (e.g., BMC 212 utilizing the BMC RAM 312 and/or BMC ROM 316) may be used for debugging and/or adding features even if a larger memory size is required, either temporarily or permanently. The system BIOS firmware image may be remotely updatable while the information handling system 200 is powered down (e.g., when in AUX mode), therefore rebooting the information handling system or local booting to execute an update, e.g., DOS utility update, will not be required. No redundant BIOS firmware images or call hardware bad alarms are needed because of a corrupted BIOS image.

It is contemplated and with in the scope of this disclosure that any information handling system, e.g., blade server, rack/tower server, workstation, thin client, etc., having a BMC and the like may have the benefit of a virtual firmware hub instead of a prior technology hardware firmware hub, according to the teachings of this disclosure.

According to the teachings of this disclosure, the BMC 212 may have both a BMC ROM 316, e.g., FLASH memory, and a BMC RAM 312. The BMC 212 may be coupled to the LPC bus 213 and may be used instead of the prior technology firmware hub 398 to emulate its functionality to the chipset. The BMC 212 thereby may function as a virtual firmware hub instead of the expensive, board space consuming and power using prior technology firmware hub 398.

The firmware image may be loaded into the BMC RAM 312, for example in a rack or tower information handling system, from the BMC ROM 316. Generally, a BMC ROM 316 has plenty of memory capacity to hold both the normal BMC firmware and a system BIOS firmware image. Remote or local administrators and/or users may update the BMC ROM 316 with the latest BMC firmware and the system BIOS at substantially the same time.

In a blade server system, the chassis management controller (CMC) 204 may have a powerful central processing unit (CPU), a large capacity RAM 386, e.g., greater than 256 megabytes (MB), and a large capacity ROM 384, e.g., 128 MB FLASH. Therefore there is plenty of capacity for the CMC 204 to store all of the BIOS images for BSMs 210, e.g., BIOS sector 388a to BIOS sector 388n and the CMC 204 may also run a "trivial file transfer protocol" (TFTP) server application on an internal management network. So that when each BMC 212 boots (before the BSM 210 may be fully powered on), it may execute a TFTP load of the BIOS firmware image from the CMC 204 (e.g., a BIOS sector 388) to the respective local (on board blade) BMC RAM 312. Thus the savings by not requiring local firmware hubs may be scaled, and the same or different BIOS images (one for each of the BSMs 210) may all be managed through configuration of just the CMC 204. This further enhances the robustness of disaster recovery and tolerance to user errors, e.g., a blade accidentally being powered off during a BIOS firmware image update.

The aforementioned BIOS firmware image management may also be applied for rack and tower servers through a remote assistant card (RAC), also represented by the numeral 204. Wherein the BIOS firmware image may be transferred to the BMC ROM 318 of the rack and/or tower servers (not shown).

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. An information handling system, said system comprising:
   a plurality of blade server modules, wherein each of the plurality of blade server modules has a baseboard management controller (BMC) comprising a BMC processor, a BMC random access memory (RAM) and a BMC read only memory (ROM); and
   a chassis management controller (CMC), wherein the CMC comprises a CMC service processor, a CMC ROM and a CMC RAM;
   wherein the CMC ROM stores a plurality of basic input-output system (BIOS) firmware images for the plurality of blade server modules and the CMC service processor transfers the plurality of BIOS firmware images to respective ones of the plurality of blade server modules; and
   wherein the CMC is adapted to communicate with an image server for updating the plurality of BIOS firmware images.

2. The information handling system according to claim 1, wherein the CMC ROM is an electrically erasable and programmable read only memory (EEPROM).

3. The information handling system according to claim 2, wherein the CMC ROM is FLASH memory.

4. The information handling system according to claim 1, wherein the BMC ROM is an electrically erasable and programmable read only memory (EEPROM).

5. The information handling system according to claim 4, wherein the BMC ROM is FLASH memory.

6. The information handling system according to claim 1, wherein the BMC processor communicates with the blade server module over a low pin count (LPC) bus.

7. The information handling system according to claim 1, wherein the CMC processor communicates with the BMC processor over a serial data link.

8. The information handling system according to claim 7, wherein the serial data link is an Ethernet network.

9. The information handling system according to claim 1, wherein the CMC processor communicates with the BMC processor with a trivial file transfer protocol (TFTP).

10. The information handling system according to claim 1, wherein the updated plurality of BIOS firmware images are stored in the CMC ROM.

11. An information handling system, said system comprising:
    at least one server, wherein the at least one server has a baseboard management controller (BMC) comprising a BMC processor, a BMC random access memory (RAM) and a BMC read only memory (ROM); and
    a remote assistant card (RMC), wherein the RMC comprises a RMC service processor, a RMC ROM and a RMC RAM;
    wherein the RMC ROM stores at least one basic input-output system (BIOS) firmware image for the at least one server and the RMC service processor transfers the at least one BIOS firmware image to a respective one of the at least one server; and
    wherein the RMC is adapted to communicate with an image server for updating the at least one BIOS firmware image.

12. The information handling system according to claim 11, wherein the at least one server is at least one rack server.

13. The information handling system according to claim 11, wherein the at least one server is at least one tower server.

14. The information handling system according to claim 11, wherein the RMC processor communicates with the BMC processor over a serial data link.

15. The information handling system according to claim 14, wherein the serial data link is an Ethernet network.

16. A blade server module, comprising:
    a central processing unit (CPU);
    a chipset coupled to the CPU;
    a BMC processor coupled to the chipset;
    a BMC random access memory (RAM) coupled to the BMC processor; and
    a BMC read only memory (ROM) coupled to the BMC processor;
    the BMC processor is adapted for coupling to a chassis management controller (CMC), wherein the CMC comprises a CMC service processor, a CMC ROM and a CMC RAM; whereby the CMC ROM stores an input-output system (BIOS) firmware image for the blade server module and the CMC service processor transfers the BIOS firmware image to the blade server module; and
    wherein the CMC is adapted to communicate with an image server for updating the BIOS firmware image.

* * * * *